United States Patent
Grymko et al.

(10) Patent No.: US 7,207,403 B2
(45) Date of Patent: Apr. 24, 2007

(54) TRANSPORTABLE POWER WHEELCHAIR

(75) Inventors: Christopher E. Grymko, Plains, PA (US); Paul Taylor, West Wyoming, PA (US); Gerald White, Hunlock Creek, PA (US)

(73) Assignee: Pride Mobility Products Corporation, West Pittston, PA (US)

( * ) Notice: Subject to any disclaimer, the term of this patent is extended or adjusted under 35 U.S.C. 154(b) by 328 days.

(21) Appl. No.: 10/960,541

(22) Filed: Oct. 7, 2004

(65) Prior Publication Data

US 2005/0077698 A1 Apr. 14, 2005

Related U.S. Application Data

(60) Provisional application No. 60/554,005, filed on Mar. 16, 2004, provisional application No. 60/509,489, filed on Oct. 8, 2003.

(51) Int. Cl.
*B60K 1/00* (2006.01)

(52) U.S. Cl. .................. 180/65.1; 180/907; 297/DIG. 4

(58) Field of Classification Search .............. 180/65.1, 180/68.5, 907; 280/304.1; 297/330, DIG. 4
See application file for complete search history.

(56) References Cited

U.S. PATENT DOCUMENTS

| | | | | |
|---|---|---|---|---|
| 2,369,040 A | 2/1945 | Grady | ................... | 155/22 |
| 3,437,164 A | 4/1969 | Rabjohn | ................... | 180/68.5 |
| 3,618,968 A | 11/1971 | Greer | ................... | 280/47.11 |
| 3,749,192 A * | 7/1973 | Karchak et al. | ............. | 180/6.5 |
| 3,820,811 A | 6/1974 | Lapham | ................... | 280/99 |
| 3,883,153 A | 5/1975 | Singh et al. | ......... | 280/124.104 |
| 3,896,891 A * | 7/1975 | Miltenburg et al. | ......... | 180/6.5 |
| 3,917,312 A | 11/1975 | Rodaway | ............ | 280/242 WC |
| 3,937,490 A | 2/1976 | Nasr | ................... | 280/242 WC |
| 3,976,152 A | 8/1976 | Bell | ................... | 180/9 |
| 4,209,073 A * | 6/1980 | Enix | ................... | 180/65.6 |
| 4,323,133 A | 4/1982 | Williams | ................... | 180/65 R |
| 4,405,142 A | 9/1983 | Whetstine | ............ | 280/242 WC |
| 4,576,389 A | 3/1986 | Villaveces et al. | ....... | 280/43.16 |
| 4,676,519 A | 6/1987 | Meier | ................... | 280/242 WC |
| 4,741,547 A | 5/1988 | Tholkes | ............... | 280/242 WC |
| 4,754,946 A | 7/1988 | Constantin | ............... | 248/503.1 |
| 4,763,951 A | 8/1988 | Silverman | ................... | 297/354 |
| 4,955,624 A | 9/1990 | Jeun-Long | ................... | 280/42 |
| 4,967,864 A * | 11/1990 | Boyer et al. | ............... | 180/65.1 |
| 5,112,069 A | 5/1992 | Aldus et al. | ................... | 280/42 |
| 5,141,250 A | 8/1992 | Morgan et al. | .......... | 280/250.1 |
| 5,143,391 A | 9/1992 | Robertson et al. | ....... | 280/250.1 |
| 5,145,197 A | 9/1992 | Gatti | ................... | 280/304.1 |
| 5,156,226 A * | 10/1992 | Boyer et al. | ............... | 180/65.1 |

(Continued)

*Primary Examiner*—J. Allen Shriver
(74) *Attorney, Agent, or Firm*—DLA Piper US LLP

(57) ABSTRACT

A transportable power wheelchair is provided which employs a variety of detachable modules to facilitate transportation and storage. The wheelchair may be readily disassembled/reassembled by a single individual without assistance and/or the need for special tools. The wheelchair includes a power supply unit, a pair of primary drive wheels, and a drive train subassembly mounting and independently driving each at least one of the drive wheels. First and second main frame subassemblies preferably have mounted thereon one of the drive train subassemblies. The power supply unit is also detachably mounted therebetween. At least one cross member assembly connects the main frame subassemblies. The cross member assembly, in combination with the main frame subassemblies, define the main frame assembly. A seat is also detachably mounted to the main frame assembly by means of the cross members.

12 Claims, 14 Drawing Sheets

U.S. PATENT DOCUMENTS

| | | | |
|---|---|---|---|
| 5,176,393 A | 1/1993 | Robertson et al. | 280/250.1 |
| 5,186,480 A | 2/1993 | Morgan et al. | 280/250.1 |
| 5,197,559 A | 3/1993 | Garin, III et al. | 180/65.1 |
| 5,288,091 A | 2/1994 | Deschamps | 180/409 |
| 5,351,774 A * | 10/1994 | Okamoto | 180/65.1 |
| 5,358,263 A | 10/1994 | Aldus et al. | 280/42 |
| 5,423,562 A | 6/1995 | Pearce, Jr. | 280/250.1 |
| 5,427,398 A | 6/1995 | Weybrecht | 280/304.1 |
| 5,487,437 A | 1/1996 | Avitan | 180/6.5 |
| 5,522,734 A | 6/1996 | Goertzen | 439/500 |
| 5,564,786 A | 10/1996 | Peek et al. | 297/452.4 |
| 5,588,799 A | 12/1996 | Kreitmeier | 415/211.2 |
| 5,743,545 A | 4/1998 | Kunze et al. | 280/250.1 |
| 5,853,059 A | 12/1998 | Goertzen et al. | 180/65.6 |
| 5,924,506 A | 7/1999 | Perego | 180/65.5 |
| 5,944,131 A | 8/1999 | Schaffner et al. | 180/65.1 |
| 5,996,716 A * | 12/1999 | Montiglio et al. | 180/65.5 |
| 6,036,216 A | 3/2000 | Osborn | 280/304.1 |
| 6,073,958 A | 6/2000 | Gagnon | 280/650 |
| 6,129,165 A | 10/2000 | Schaffner et al. | 180/65.1 |
| 6,186,252 B1 | 2/2001 | Schaffner et al. | 180/65.1 |
| 6,196,343 B1 | 3/2001 | Strautnieks | 180/22 |
| 6,212,731 B1 | 4/2001 | Eckerlein et al. | 15/320 |
| 6,220,382 B1 * | 4/2001 | Kramer et al. | 180/65.5 |
| 6,241,275 B1 | 6/2001 | Slagerman | 280/650 |
| 6,352,275 B1 | 3/2002 | Lindenkamp | 280/250.1 |
| 6,439,331 B1 * | 8/2002 | Fan | 180/208 |
| 2004/0040769 A1 | 3/2004 | Richey, II et al. | 180/210 |
| 2004/0060748 A1 | 4/2004 | Molnar | 180/65.1 |
| 2004/0084230 A1* | 5/2004 | Grymko et al. | 180/65.1 |
| 2004/0150204 A1 | 8/2004 | Goertzen et al. | 280/755 |
| 2005/0077698 A1* | 4/2005 | Grymko et al. | 280/208 |
| 2006/0213705 A1* | 9/2006 | Molnar | 180/65.2 |

\* cited by examiner

TRANSPORTABLE POWER WHEELCHAIR

CROSS-REFERENCE RELATED APPLICATION

This application claims the benefit of the filing date of U.S. Provisional Patent Application No. 60/554,005, filed on Mar. 16, 2004 and U.S. Provisional Patent Application No. 60/509,489, filed on Oct. 8, 2003.

TECHNICAL FIELD

The present invention relates to power wheelchairs, and more particularly to a power wheelchair that facilitates assembly/disassembly for ease of transportation and storage.

BACKGROUND OF THE INVENTION

Self-propelled or powered wheelchairs have vastly improved the mobility/transportability of the disabled and/or handicapped. Whereas in the past, disabled/handicapped individuals were nearly entirely reliant upon the assistance of others for transportation, the Americans with Disabilities Act (ADA) of June 1990 has effected sweeping changes to provide equal access and freedom of movement/mobility for disabled individuals. Notably, various structural changes have been mandated to the construction of homes, offices, entrances, sidewalks, and even parkway/river crossing, e.g., bridges, to include enlarged entrances, powered doorways, entrance ramps, curb ramps, etc., to ease mobility for disabled persons in and around society.

Along with these societal changes has come an opportunity to offer better, more agile, longer-running and/or more stable powered wheelchairs to take full advantage of the new freedoms mandated by the ADA. More specifically, various technologies, initially developed for the automobile and aircraft industries, are being successfully applied to powered wheelchairs to enhance the ease of control, improve stability, and/or reduce wheelchair weight and bulk. For example, sidearm controllers, i.e., multi-axis joysticks, employed in high technology VTOL and fighter aircraft, are being utilized for controlling the speed and direction of powered wheelchairs. Innovations made in the design of automobile suspension systems, e.g., active suspension systems, which vary spring stiffness to vary ride efficacy, have also been adapted to wheelchairs to improve and stabilize powered wheelchairs. Other examples include the use of high-strength fiber reinforced composites, e.g., graphite, fiberglass, etc., to improve the strength of the wheelchair frame while reducing weight and bulk.

One particular system which has gained widespread popularity/acceptance is mid-wheel drive powered wheelchairs, and more particularly, such powered wheelchairs with independently driven and controlled drive wheels. Mid-wheel powered wheelchairs are often designed to position the drive wheels, i.e., the rotational axes thereof, slightly forward of the overall Center Of Gravity (COG) of the occupant and wheelchair to provide enhanced stability and maneuverability. Further, the ability to independently control the speed and torque of each wheel vastly improves the maneuverability, particularly in the yaw axis, of powered wheelchairs. That is, the drive wheels may be driven in opposite directions to enable yaw or heading changes with essentially a zero turn radius. The wheelchair, therefore, can turn within very confined areas and at essentially double the rate. Such mid-wheel powered wheelchairs are disclosed in Schaffner et al. U.S. Pat. Nos. 5,944,131 & 6,129,165, both commonly assigned to Pride Mobility Products Corporation of Exeter, Pa.

While such wheelchair designs have vastly improved the capability and stability of powered wheelchairs, designers thereof are continually being challenged to examine and improve wheelchair design and construction. While these are all welcome advances, they also necessarily add weight and complexity to the vehicle.

Contemporary powered wheelchairs, which may include as many as three power supply units (e.g. batteries), a seat, footrest, a main structural frame, drive train assembly other sundry items, can weight several hundred pounds. It will be appreciated, therefore, that even the most physically able individual will require some form of assistance when transporting a powered wheelchair to another destination. In an effort to ameliorate the transportability of such powered wheelchairs, various efforts have been made to augment the lift capacity for the wheelchair user. Perhaps the best known examples are those which are used in combination with a ramp or elevator for rolling or lifting the wheelchair into a vehicle. These "powered-lift systems", as one may readily appreciate, are expensive and are limited in use on vehicles of sufficient size to accommodate the assembled wheelchair and the hydraulic or pneumatic lifting equipment.

Other wheelchairs employ folding frames or removable assemblies in an effort to reduce their weight and/or bulk. As such, these wheelchairs may be stowed and transported in vehicles having a smaller payload capacity. While these wheelchairs have improved the transportability, they typically require the disassembly of multiple components, e.g., fasteners, pins, C-rings, clamps, etc., to yield individual assemblies of appropriate size and/or weight. Alternatively, other designs require the use of special tools to "breakdown" or fold the various wheelchair components.

Kramer, Jr. et al. (U.S. Pat. No. 6,220,382) discloses a wheelchair having a separable frame which requires the breakdown of as many as eight separate elements. These designs do not always facilitate rapid disassembly and/or reassembly and, furthermore, create an unwelcome opportunity to misplace, omit, or improperly install smaller assembly items.

A need, therefore, exists to provide a transportable wheelchair which (i) permits assembly and disassembly in a rapid and expeditious fashion, (ii) minimizes the number of assemblies, (iii) eliminates the potential for omission of smaller parts or improper reassembly, and (iv) enhances the ability to handle/manipulate subassemblies.

SUMMARY OF THE INVENTION

A transportable powered wheelchair is provided which employs a variety of detachable modules to facilitate transportation and storage. The powered wheelchair includes a power supply unit, a pair of primary drive wheels, and a drive train subassembly rotatably mounting and independently driving each of the drive wheels. The powered wheelchair is further characterized by first and second main frame subassemblies each mounting one of the drive train subassemblies and detachably mounting the power supply unit therebetween. At least one cross member assembly connects the main frame subassemblies. The cross member is detachably mounted to each of the main frame subassemblies. The cross member assembly, in combination with the main frame subassemblies, define a main frame assembly having first and second detachable mounts. At least one of the detachable mounts is adapted to accept and pre-position the main frame subassemblies thereby facilitating the attachment of the detachable mount. A seat is also detachably mounted to the main frame assembly.

In one embodiment of the invention, the first detachable mount defines a hinge axis and the cross member assembly is caused to rotate about the hinge axis for attaching the second detachable mount to each of the main frame subassemblies. Further, the cross member assembly may complete one or more electrical connections during the physical parts assembly.

BRIEF DESCRIPTION OF THE DRAWINGS

For the purpose of illustrating the invention, there is shown in the drawings various forms that are presently preferred; it being understood, however, that this invention is not limited to the precise arrangements and constructions particularly shown.

DETAILED DESCRIPTION OF THE DRAWINGS

Figure 1:
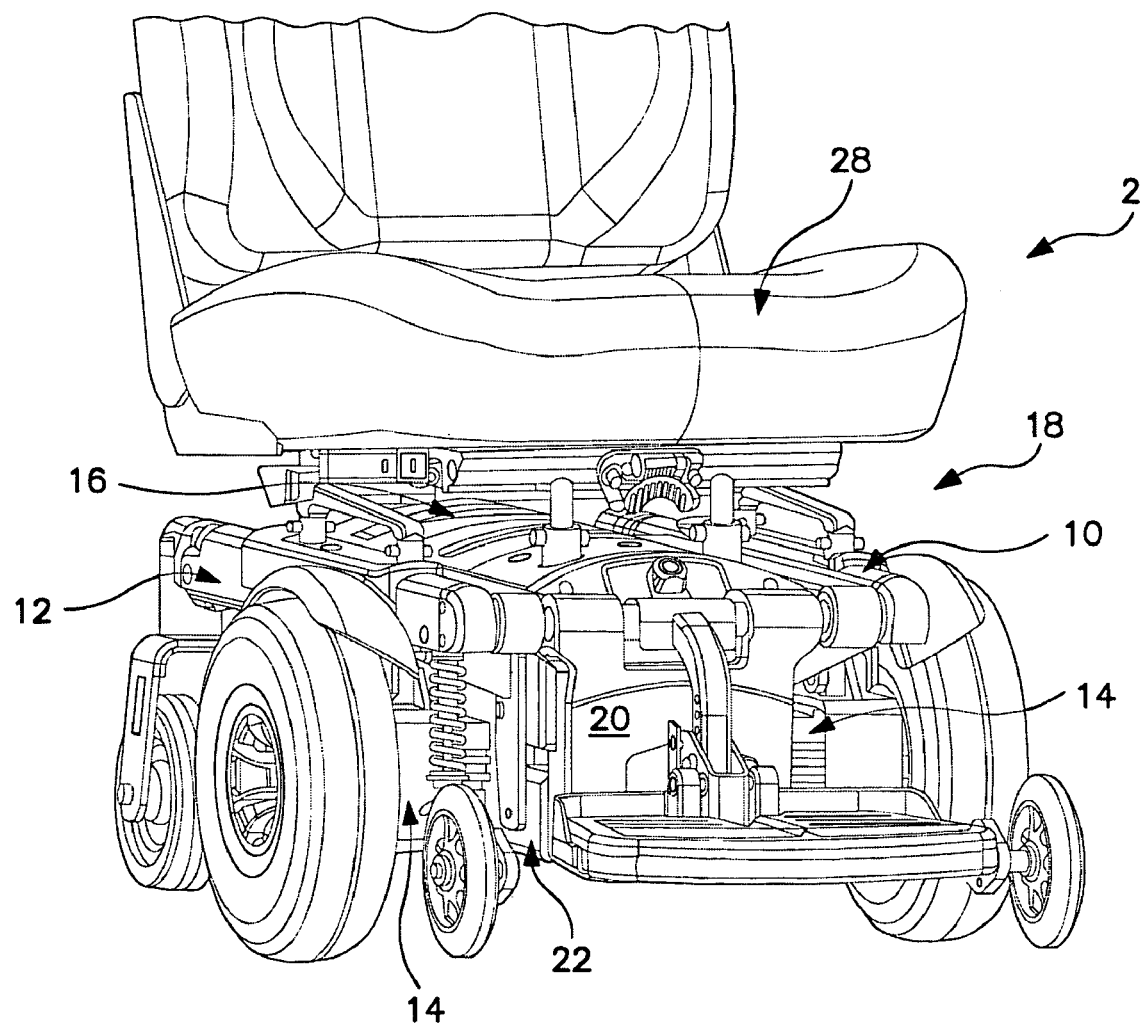
FIG. 1 is a perspective view of a transportable powered wheelchair according to the present invention.

Referring now to the drawings wherein like reference numerals identify like elements, components, subassemblies etc., FIG. 1 depicts a perspective view of an exemplary embodiment of the transportable power wheelchair of the present invention, which is generally referred to by the numeral 2. The wheelchair 2, as shown and described herein, is described in the context of a mid-wheel drive powered wheelchair, however, the invention is readily applicable to other powered wheelchair designs/configurations.

The wheelchair 2 includes several modules and assemblies which may be broken-down into manageable sections for an individual (having normal strength and dexterity) to assemble/disassemble for transport. The phrase "manageable sections" means that the various modules, assemblies and/or subassemblies are each under a threshold weight, e.g., under 30–50 lbs. In addition to the modularization of the powered wheelchair 2, the disassembly and reassembly thereof is to be performed without the use of special tools. In fact, the disassembly/reassembly is preferably performed without tools of any kind, i.e., such operations are performed manually or by hand.

Figure 2:
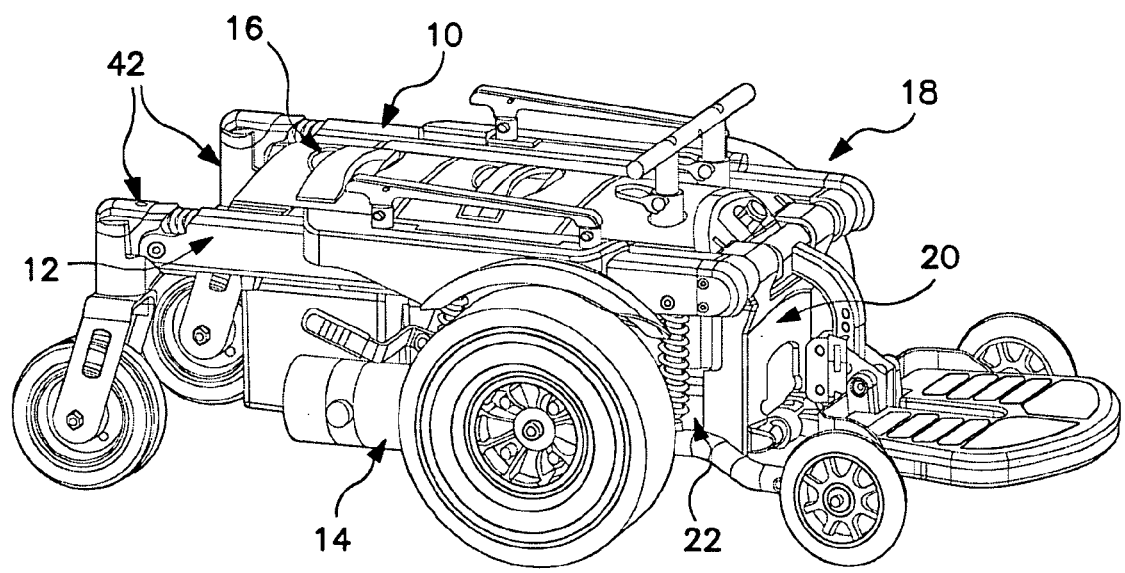
FIG. 2 is an isolated perspective view of the main frame assembly according to the present invention.

In the broadest sense of the invention, and referring to FIGS. 1 and 2, the powered wheelchair 2 comprises first and second main frame subassemblies 10 and 12, respectively, each mounting a drive train subassembly 14 and detachably mounting a power supply unit 16 (best shown in FIG. 2) therebetween. At least one cross member assembly 20 connects the main frame subassemblies 10, 12 which, in combination, define a base or main frame assembly 18. The cross member assembly 20, in combination with the main frame subassemblies 10, 12, furthermore, define first and second detachable mounts interposing at least one crossing load path. In the perspective views shown, only the first detachable mount 22 is visible, inasmuch as second detachable mount is disposed on the opposite side of the cross member assembly 20. Other configurations are contemplated, such as that described in commonly owned co-pending patent application entitled "Transportable Wheelchair." The load path extends from a point or position on one of the main frame subassemblies through the cross member assembly 20 to a position on the other of the main frame subassemblies. The load path also crosses or passes through one of the first or second detachable mounts 22, i.e., between the cross member assembly 20 and each of the main frame subassemblies 10, 12. The load paths carried by the cross member assembly and the detachable mounts will be readily apparent when viewing the other figures and internal structural details of the powered wheelchair 2.

A principle teaching of the invention relates to the adaptation of the cross member assembly 20 and, in particular to the adaptation of one of the detachable mounts 22 to accept and pre-position the main frame subassemblies 10, 12 to facilitate the attachment of the other detachable mount. Furthermore, a seat support assembly 200 is adapted to facilitate assembly by several guide channels and/or tracks which forgive misalignment of assembly components. It will be appreciated that misalignment is especially problematic when assembling a seat 28 (FIG. 1) employing a mounting arrangement disposed along the underside thereof. Finally, a flexible/soft mount castor assembly 42 (see FIG. 2) improves the ride efficacy of the wheelchair 2.

The invention will first be described in terms of the individual modules and assemblies, which when assembled, produce a structurally-efficient transportable powered wheelchair 2. Subsequently, the discussion will focus on the assembly/disassembly of the wheelchair to gain a better appreciation for the various teachings of the invention. The description is, therefore, organized in the following order: I) Main Frame Subassemblies, II) Cross Member Assembly, III) Seat Support Assembly, IV) Power Supply Support Assembly, and V) Wheelchair Assembly/Disassembly.

Figure 3:
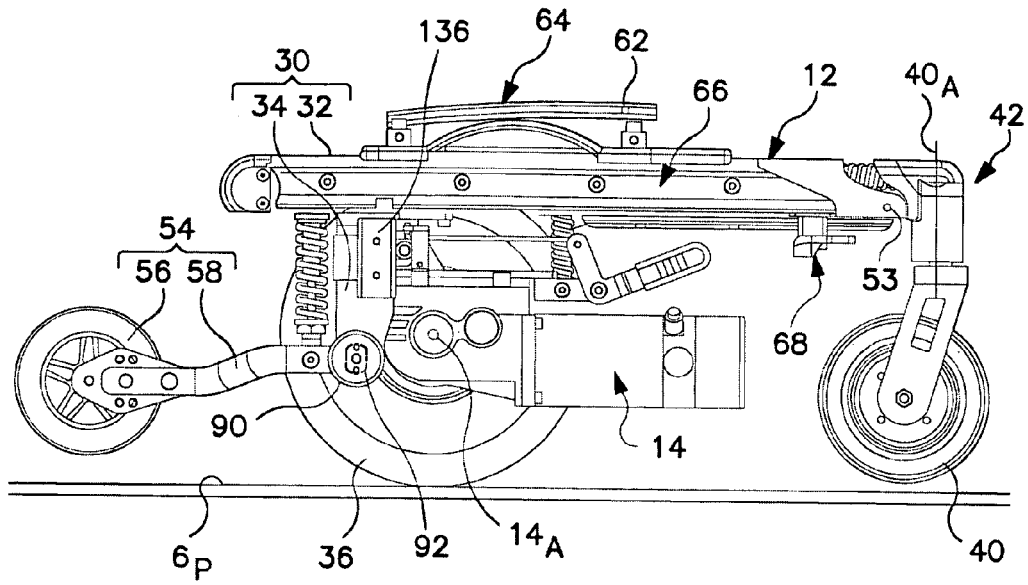
FIG. 3 is a side profile view of one of the main frame subassemblies according to the present invention.

Inasmuch as the main frame subassemblies 10, 12 are essentially identical, only one of the subassemblies 12 will be described in detail. In FIG. 3, a profile view of the main frame subassembly 12 is depicted along an inwardly facing side, i.e., a side which, when assembled, faces inwardly toward the opposed subassembly. The main frame subassembly 12 includes a side frame support 30 having a substantially horizontal upper segment 32, i.e., horizontal relative to a ground plane $G_P$, and a substantially vertical forward segment 34 orthogonal to the upper segment 32. In the described embodiment the forward segment 34 is mounted to the underside of the upper segment 32, however, the segments 32, 34 may be integrally formed during manufacture of the side frame support 30. The upper segment 32 carries one of the drive train subassemblies 14 of the wheelchair propulsion system. The drive train subassembly 14 is pivotally mounted to the upper segment 32 about a pivot axis $14_A$ and independently drives a primary drive wheel 36. Inasmuch as each of the primary drive wheels 36 is independently driven, the powered wheelchair 2 may be easily maneuvered in confined areas, i.e., due to the ability to drive each wheel 36 in opposite directions. As mentioned earlier, this drive train/wheel configuration is known as a mid-wheel design and includes a rear caster 40 for supporting the wheelchair 2 on at least three wheels, i.e., the two primary drive wheels 36 and at least one rear castored wheel 40.

Figure 3A:
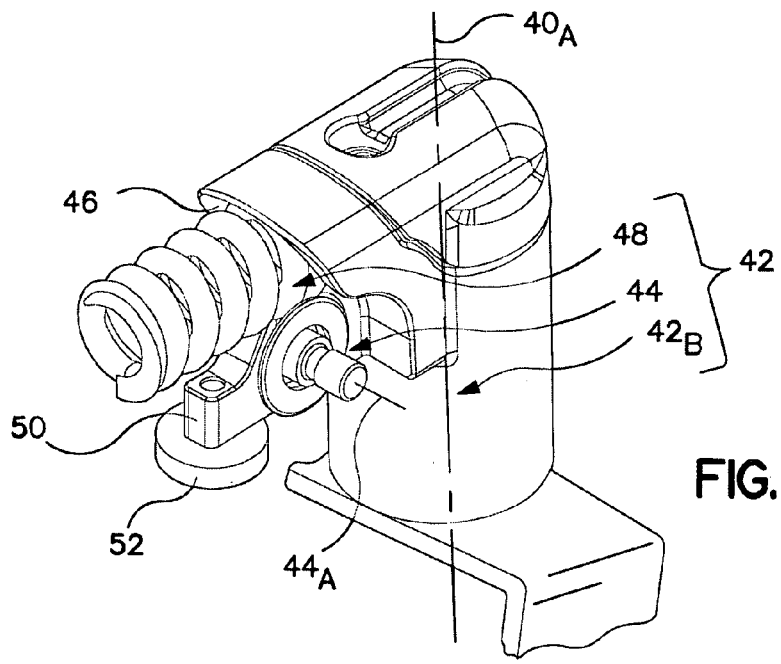
FIG. 3a is an enlarged isolated perspective view of a castor assembly for mounting a rear wheel to an aft end of each main frame subassembly.

In FIGS. 3 and 3a, the main frame subassembly 12 preferably includes a rear castor assembly 42 which is pivot mounted to an aft end of the horizontal upper segment 32. More specifically, the castor assembly 42 includes a castor barrel $42_B$ adapted to support and facilitate rotation of the castor wheel 40 about a vertical axis $40_A$. Furthermore, the castor assembly 42 includes an end fitting 44 projecting orthogonally from and relative to the vertical axis $40_A$ of the castor assembly 42. The pivot axis $44_A$ of the castor assembly is formed through the end fitting 44 and lies parallel to the wheelchair pitch axis (not shown), i.e., the axis about which the wheelchair 2 pitches forward or aft. Moreover, the castor assembly 42 is spring biased about the pivot axis $44_A$ such that the castor wheel 40 may be displaced under load in either direction, yet return to a predetermined initial operating position.

In the preferred embodiment, the upper end of the castor barrel $42_B$, or the end fitting 44, forms a cup-shaped receptacle 46 for accepting one end of a coil spring 48. The other end thereof bears against the upper support segment 34 such that the spring axis $48_A$ is spaced-apart from the pivot axis $44_A$ of the end fitting 44. Consequently, when an external load is applied to the castor wheel 40, whether vertical or longitudinal (i.e., fore and aft), the wheel may displace about the pivot axis $44_A$ until the spring force equilibrates the external load. As such, the end fitting 44 and coil spring 48 serve as a simple, easily assembled and fabricated, castor wheel suspension.

The spring force of the individual castor wheel suspension may be adjusted by a lever arm 50 projecting beyond or forwardly of the pivot axis $44_A$ of the end fitting 44. That is, an adjustment screw (not shown) causes a washer plate 52 to bear against a clevis attachment 53 (FIG. 3) formed at the end of the upper segment 32. As the adjustment screw is turned, the washer plate 52 incrementally changes the rotational position of the end fitting 44 relative to the horizontal upper segment 32, thus defining the initial operating position. As the axial length of the coil spring 48 changes, the preload on the end fitting 44/castor assembly 42 changes. This adjustment capability increases or decreases the spring force required to displace the castor assembly 42 and, consequently, the stiffness of the individual castor wheel suspension.

In FIG. 3, the main frame subassembly 12 may also include an Active Anti-Tip System (AATS) 54 having a forward anti-tip wheel 56 mounted to an end of a suspension arm 58. Briefly, the AATS 54 is responsive to accelerations of the wheelchair, i.e., changes to the applied motor torque, to raise or lower the forward anti-tip wheel 56. By raising the anti-tip wheel 56, the curb climbing ability of the wheelchair 2 is improved and, by lowering the anti-tip wheel 56, the pitch stability of the wheelchair 2 is enhanced. An AATS 54 of the type described herein, is more fully described and discussed in commonly-owned U.S. Pat. No. 6,129,165. For the purposes of clarity and conciseness, the AATS system 54 will not be further discussed herein and the description found in U.S. Pat. No. 6,129,165 is incorporated herein by reference in its entirety.

The main frame subassembly 12 includes various fittings and attachments which connect to other modules of the powered wheelchair 2. These will not be discussed in detail at this time, but merely mentioned to provide a frame of reference for related elements discussed later in the description. For example, a circular retention head 90 and a pin connector 136 are disposed in combination with the forward segment 34 and upper segment 32 respectively, of the side frame support 30. These attachment fittings are disposed in combination with other fittings of the cross member assembly 20 to create the first and second detachable mounts. Further, a lateral pin 62 is disposed in combination with a longitudinal guide/support bar 64. The structure and function of the lateral pin 62 will be discussed later, however, suffice it to say at this juncture that the pin 62 and longitudinal support bar 64 detachably supports the wheelchair seat. Similarly, a mounting rail 66 is disposed along side the side frame support for detachably mounting the power supply unit 16 (FIG. 2). Moreover, a latching mechanism 68 is disposed in combination with the rail 66 for supporting the power supply unit 16. The latching mechanism 68 is a safety feature which prevents electrical connections from being made until the power supply unit has fully engaged the rail 66.

Figure 4:
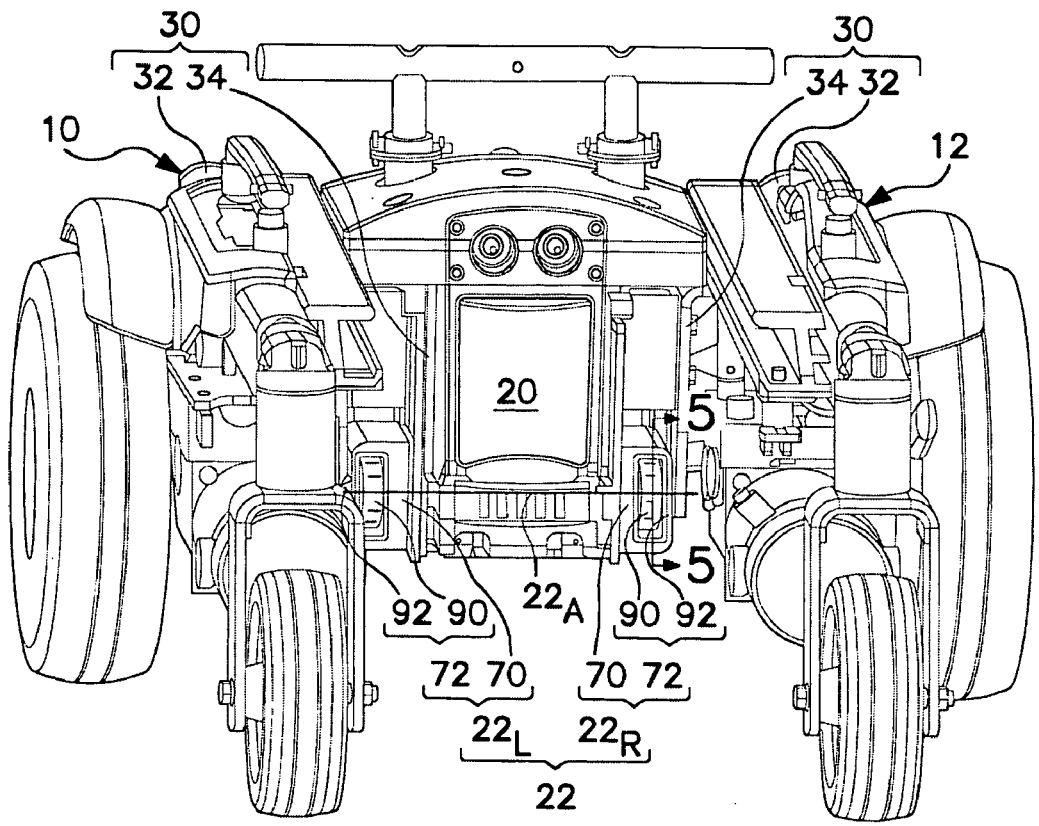
FIG. 4 is an isometric illustration of the cross member assembly from a rear view perspective illustrating the assembly components which define first and second detachable mounts for connecting the cross member assembly to each of the main frame subassemblies.
Figure 5:
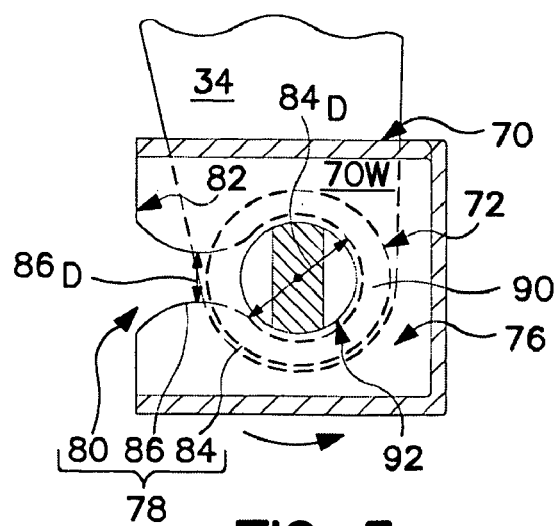
FIG. 5 depicts a cross sectional view taken substantially along line 5—5 of FIG. 4a for revealing the internal details of the first detachable hinge mount which connects the cross member assembly to one of the main frame subassemblies.

In FIGS. 3, 4, and 5, the Cross Member (CM) assembly 20 functions to structurally interconnect the main frame subassemblies 10, 12 and facilitates assembly and disassembly of the powered wheelchair 2 by supporting and pre-positioning the main frame subassemblies 10, 12. The CM assembly 20 creates one or more load paths extending transversely from one of the side frame supports 30 to the other. Preferably, the load path extends across the CM assembly to identical positions along each of the main frame subassemblies 10, 12. In the preferred embodiment, the first detachable mount 22 interposes a first load path which structurally interconnects a lower portion (see FIG. 3) of each frame support 30. The second detachable mount 24 interposes a second load path which structurally interconnects an upper portion 32 of the frame support 30. In the described embodiments, both of the detachable mounts are either directly or indirectly (through an intermediate structure or component) to the vertical lower segment 34 of the side frame support 30.

The first detachable mount 22 comprises a pair of pivot mounts $22_R$, $22_L$ disposed on opposite sides of the CM assembly 20. Each of the pivot mounts $22_R$, $22_L$ comprise a cup-shaped fitting 70 disposed in combination with the cross member assembly 20 and a retention fitting 72 disposed in combination with one of the main frame subassemblies 10, 12. More specifically, each of the cup-shaped fittings 70 (see FIG. 5) defines an open-ended pocket 76 and a slot 78 disposed through a wall 70W of the fitting 70. The slot 78, furthermore, has an first end 80 disposed in register with the open end 82 of the pocket 76, a second end 84 having a substantially circular geometry and a throat region 86 disposed therebetween. The throat region 86 defines a throat opening dimension $86_D$ and the circular slot end 84 defines a slot diameter dimension $84_D$. The significance of these geometric characteristics will be appreciated following a description of the retention fitting 72 and second detachable mount 24.

The retention fitting 72 comprises a circular retention head 90 and a stationary axle 92 rigidly affixed to and projecting laterally from the vertical support segment 34 of the main frame subassembly 12. The axle 92 has a cross sectional configuration which defines a minor diameter $92_{MI}$ and a major diameter $92_{MA}$ (see FIG. 5) wherein the minor diameter $92_{MI}$ corresponds to the longitudinal width (fore and aft) dimension of the axle 92 and the major diameter $92_{MA}$ corresponds to the vertical height of the axle 92. Inasmuch as the axle 92 is stationary, such geometric relationships remain constant.

In FIG. 5, the pocket 76 of each cup-shaped fitting 70 accepts the circular retention head 90 while the slot 78 accepts the axle 92 of the retention fitting 72. It will be appreciated, however, that for the slot 78 to accept the axle 92, the minor diameter thereof must align with or be parallel to the slot axis of symmetry. Furthermore, the minor diameter $92_{MI}$ of the axle 92 must necessarily be less than the throat opening dimension $86_D$ and the major diameter $92_{MA}$ must be less than the slot end dimension $84_D$. On the other hand, to retain the retention fitting 72 the throat opening diameter $86_D$ must be less than the diameter dimension $84_D$. This will become evident when discussing the installation and assembly of the CM assembly 20 with each main frame subassembly 10, 12.

In FIGS. 3, 4, 6a–6c the second detachable mount includes a pair of retention blocks 102, 104 disposed in combination with the cross member assembly 20 and abutment surfaces 106, 108 (in FIG. 4 dashed lead lines indicate a surface under or covered by the retention blocks 102, 104), disposed in combination with each of the main frame subassemblies 10, 12. More specifically, the retention blocks 102, 104 are mounted to a handle 100 which is pivot mounted to the cross member assembly 20. The handle 100 has an L-shaped side profile (best seen in FIG. 6a) where the left main frame subassembly 10 has been removed to view a profile of the cross member assembly 20 and U-shaped aft profile to integrate the retention blocks 102, 104, i.e., causing the blocks 102, 104 to operate in unison. Further, in the preferred embodiment, the handle 100 is pivotally mounted to each side of the cross member assembly 20. That is, the handle 100 is pivotable about a pivot axis $100_A$ (shown in FIG. 6a) which is preferably disposed forwardly of an electrical connector 114 disposed in combination with the housing 116 of the cross member assembly 20.

The handle 100 is spring-biased about its pivot axis $100_A$ (FIG. 6c) such that a surface of the retention blocks 102, 104 engages the abutment surfaces 106, 108 of the main frame subassemblies 10, 12. In the described embodiment, a coil spring 110 (FIGS. 6a and 6c) connects and biases the handle 100 of the cross member assembly 20; however, a torsion or other spring-biasing element, disposed about the pivot axis $100_A$, may functionally replace the coil spring 110.

Figure 6A:
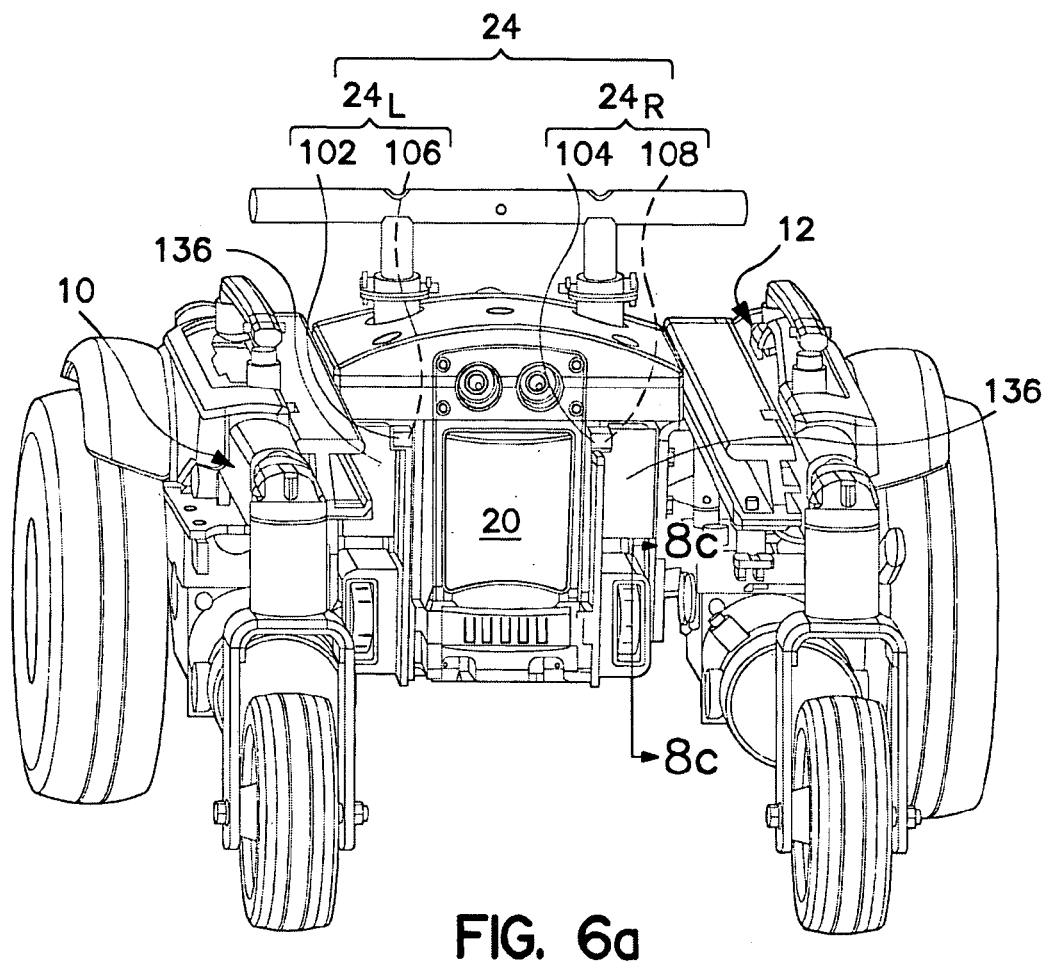
FIG. 6a is an isometric illustration of the main frame subassembly with the power supply module removed to reveal details of the second detachable mount including: a handle and a pair of retention blocks for latching the cross member assembly in an upright position.
Figure 6C:
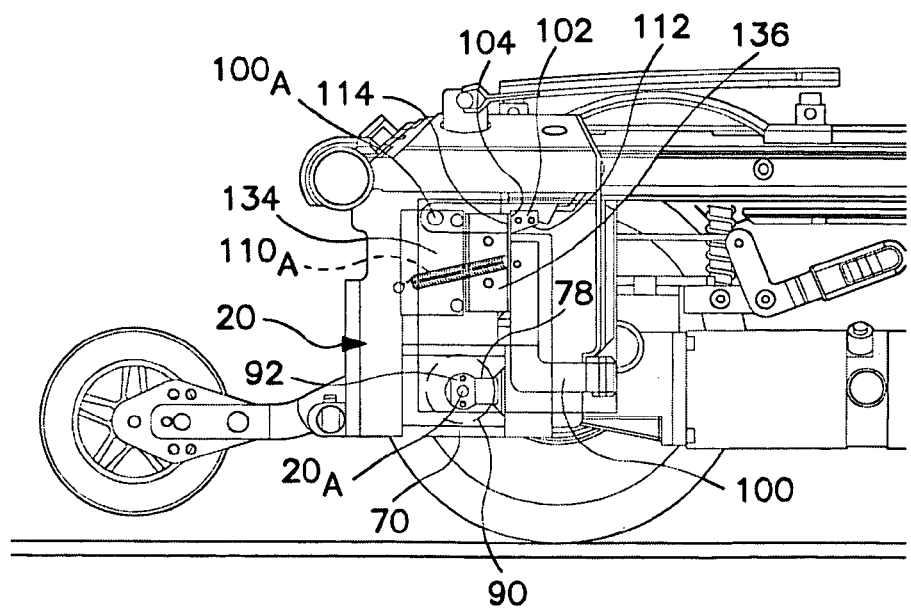
FIG. 6c is a side elevational view of the combination of a cross member assembly and one side of the main frame assembly, with the cross member assembly rotated into the upright position.
Figure 6B:
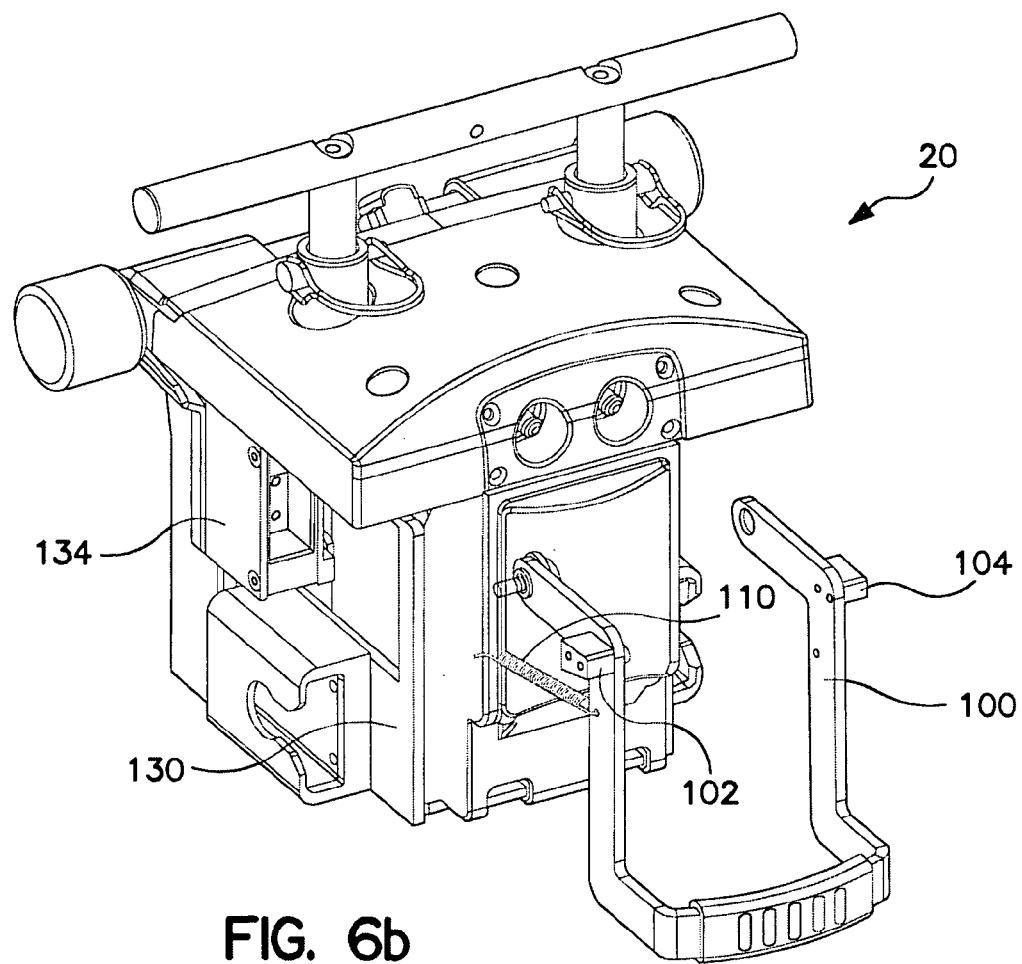
FIG. 6b is an isometric perspective of the cross member assembly from a rear view projection wherein the handle/retention blocks and a coil spring are exploded from a housing of the cross member assembly.

In the described embodiment and referring to FIG. 6c, each of the retention blocks (only one retention block 102 is shown in the figure) have a substantially polygonal profile configuration defining a lead and a locking surface, 112 and 114, respectively. While the lead and locking surfaces 112, 114 are linear in the illustrated embodiment, each may be curvilinear or define a combination of linear and/or curvilinear segments. Generally, the lead surface 112 defines an acute angle relative to a line of tangency about the hinge axis $20_A$ of the cross member assembly 20. That is, a line tangent to a circle inscribed by the pivot motion of the handle 100 and, more particularly, to a circle inscribed by the rotational motion of the retention blocks 102, 104. The significance of the geometry and angular orientation of the retention blocks 102, 104 will be appreciated when discussing the operation of the handle 100.

Before discussing the operation, assembly and function of the various assembly components, it should be understood that the cross member assembly 20 may structurally support other modules or assemblies and may be directly or indirectly connected to the side frame supports 30 of each of the main frame subassemblies 10, 12. For example, a controller or battery charger may be disposed internally of a structural housing 130 for integrating the controller/battery charger with the cross member assembly 20. In fact, the housing 130 may function to effect the load paths across the cross member assembly 20. Furthermore, the cross member assembly 20 may include one or more electrical connectors 134, e.g., a conventional pin connector, for engaging an electrical receptacle 136 (shown in FIGS. 6a and 6c) disposed in combination with one or both of the main frame subassemblies 10, 12. As such, various electrical connections, such as may be required for charging of the power supply unit 16, can be made simultaneously with the attachment of the detachable mounts 22, 24. Moreover, while the cross member assembly 20 attaches to the vertical lower segment 30, it should be appreciated that structural elements or components may be disposed between the cross member assembly 20 and the side frame support 30. For example, the pin receptacle 136 is mounted to the lower vertical segment 34 and dually functions to provide an electrical connection for the power supply module and an abutment surface 116, 118 for the second detachable mount 24.

Figure 7:
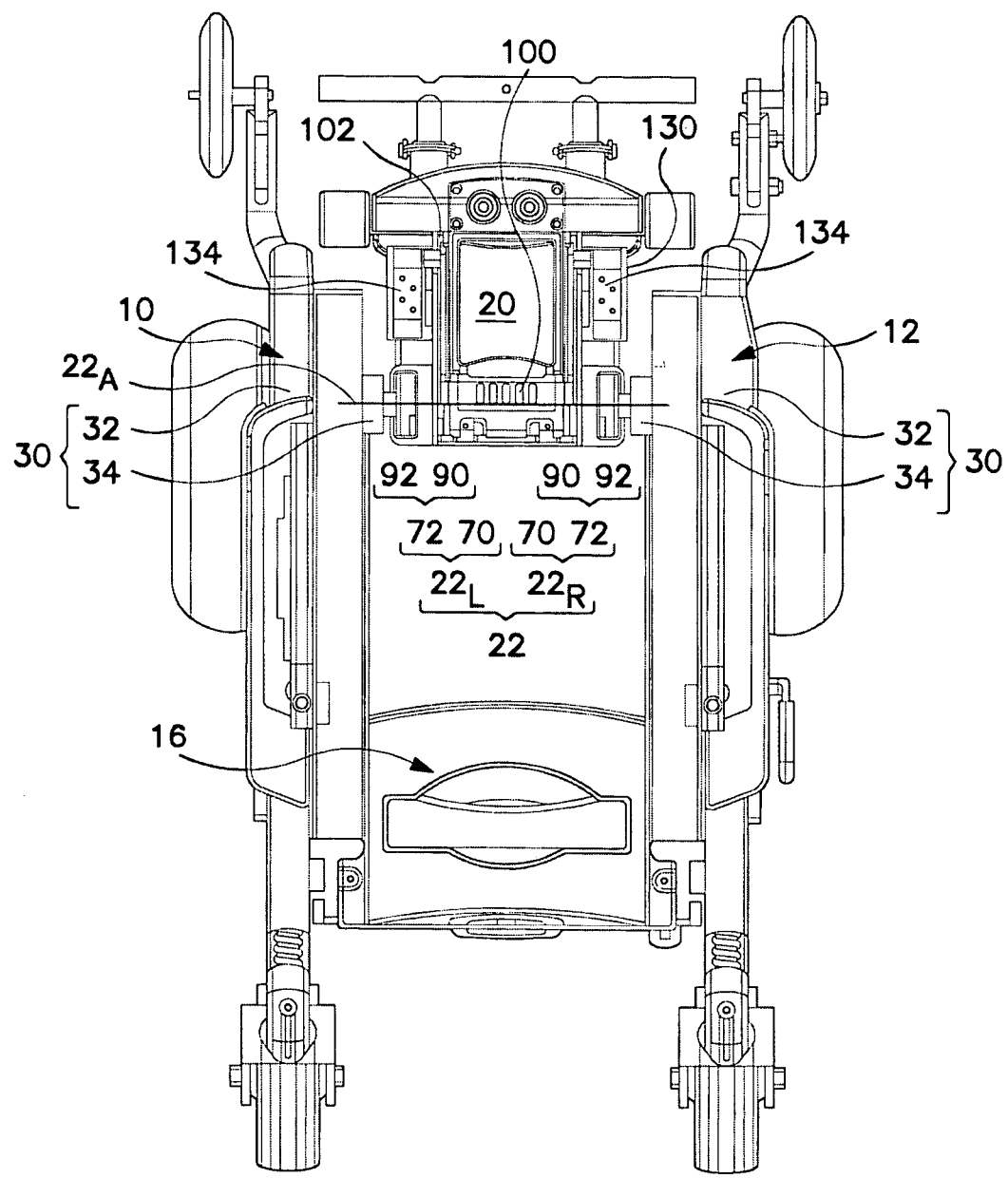
FIG. 7 is a top view of the cross member assembly supporting and pre-positioning each of the main frame subassemblies in an upright position.
Figure 8C:
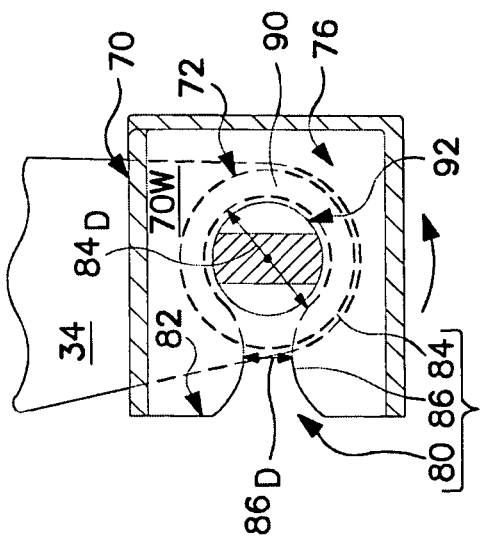
FIGS. 8a–8c depict cross sectional views of the hinge mount in various positions during assembly.
Figure 8B:
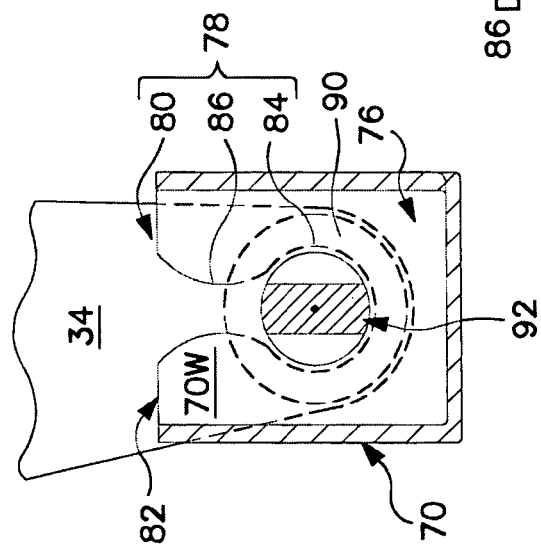
Figure 8A:
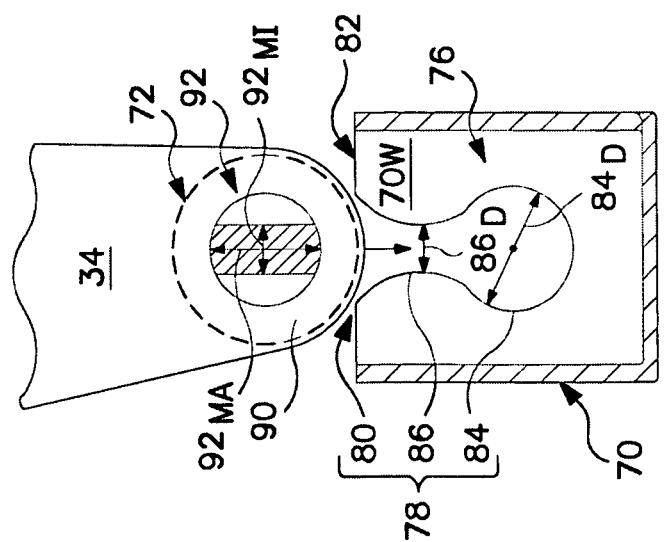

In FIGS. 7–9c, the cross member assembly 20 is laid flat or horizontally (see FIG. 7) for the circular retention head 90 (FIG. 8a) to be received within the pocket 76 of the cup-shaped fitting 70. Further, the axle 92 may slide past the throat region 86 of the slot 78 to the circular slot end 88. As such, the pivot mounts $22_R$, $22_L$ function to support the main frame subassemblies 10, 12 in a substantially upright position (FIG. 7). That is, the surface area of engagement between the circular retention head 90 and the cup-shaped fitting 70 is sufficiently large to support and align the subassemblies 10, 12 in the desired upright position. Furthermore, the pivot mounts $22_R$, $22_L$, in combination, define a hinge axis $22_A$ (see FIG. 7) about which the cross member assembly 20 may rotate.

Figure 9A:
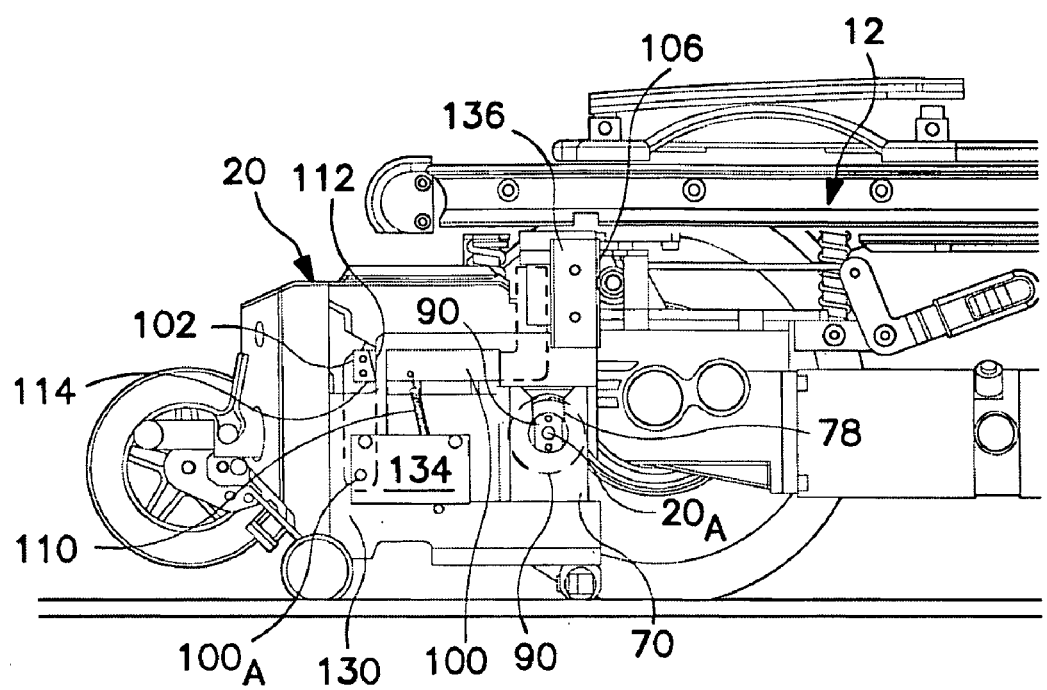
FIGS. 9a–9c are broken away side views showing the cross member assembly in various positions relative to one of the main frame subassemblies as it is pivoted into upright therewith.
Figure 9C:
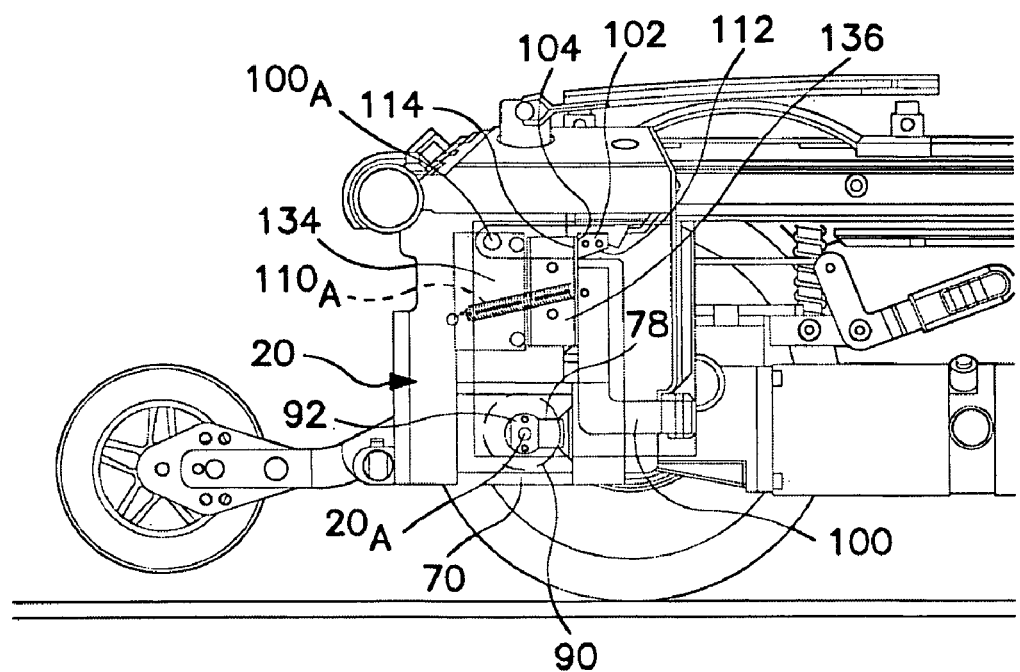
Figure 9B:
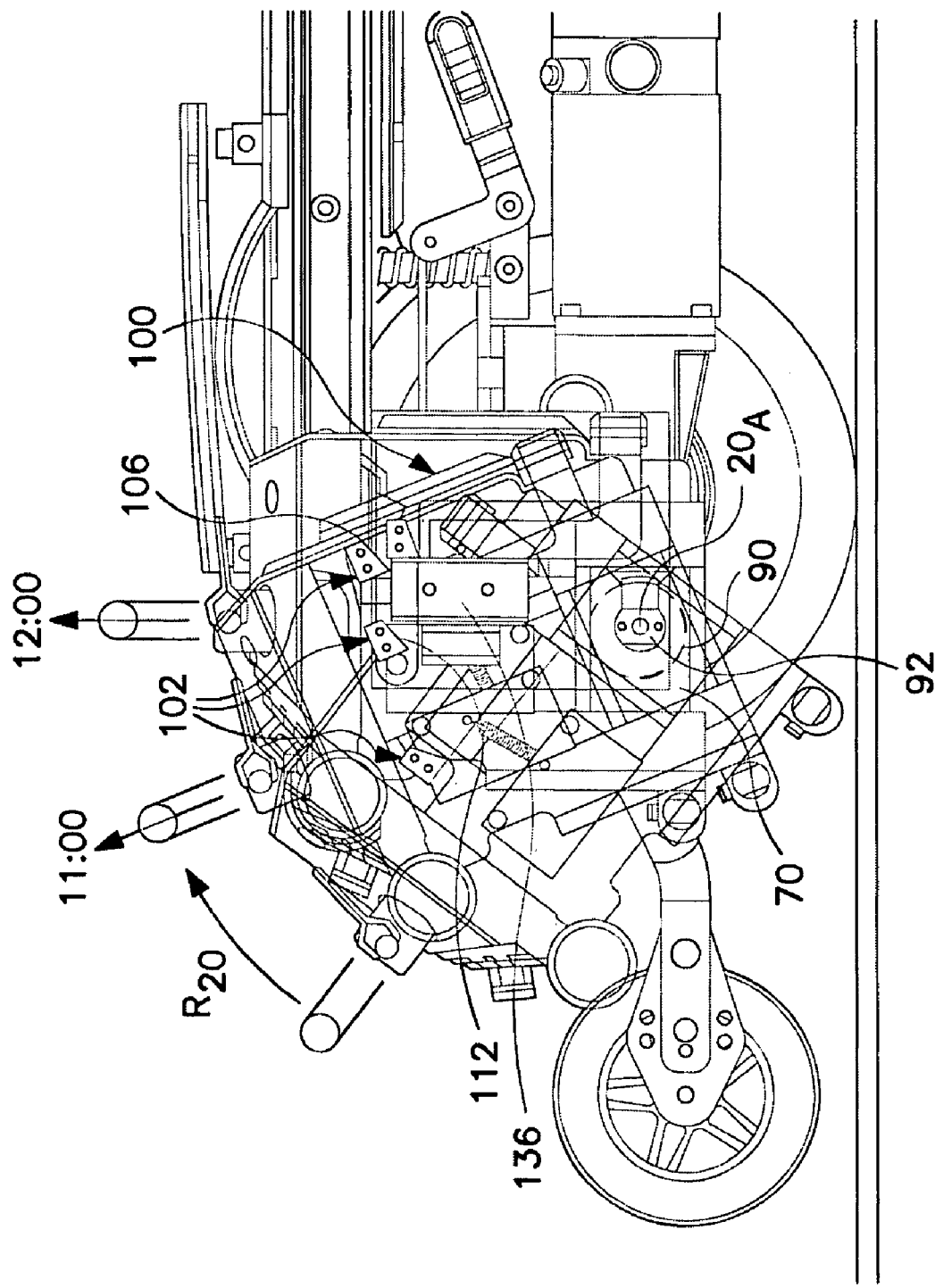

FIGS. 9a through 9c depict the operational displacement of the handle 100 and one of the retention blocks 102 as it engages and disengages the abutment surface 106. In FIG. 9a, the cross member assembly 20 lies horizontally such that the circular retention head 90 of a main frame subassembly 12 is received within the cup-shaped fitting 70. As mentioned previously, the axle 92 of the retention head 90 slides past the throat region of the slot 78 in one orientation, and is captured therein when oriented in a second position. In the described embodiment, the cup-shaped fitting 70 releases the retention head 90 when the slot 78 is substantially vertical (as shown in FIG. 9a) and captures the retention head 90 when the slot 78 (as seen in FIG. 9c) is horizontal or orthogonal to the vertical.

In FIG. 9b, the cross member assembly 20 is shown in various angular positions to reveal the motion of the handle and structural interaction of the retention block 102 with the main frame subassembly 12, and more particularly, with a pin connector 116. In the figure, the cross member assembly 20 rotates in a clockwise direction, i.e., in the direction of arrow $R_{20}$, about pivot axis $20_A$. Upon reaching an eleventh ($11^{th}$) hour position, indicated by arrow 1100, the guide surface 112 contacts the corner of the pin connector 116, thereby lifting the handle 100 vertically (i.e., rotating the handle 100 counter-clockwise). The retention block 102 slides over the top surface of the pin connector 136 until reaching the opposite corner or end of the connector 136, i.e., at the noon or ($12^{th}$) hour position denoted by arrow 1200.

Referring to FIGS. 9b and 9c, the coil spring 110 (shown in FIG. 9c) causes the handle 100 to rotate in a clockwise direction as the retention block 102 passes the pin connector. As such, the locking surface 114 of the retention block 102 engages the abutment surface 106 to retain the cross member assembly 20 in a vertical position. It will be appreciated that, inasmuch as the handle 100 crosses over the cross member assembly 20 and is symmetric relative to each side of the assembly 20, that both retention blocks 102, 104 simultaneously engage both of the abutment surfaces 106, 108. That is, the cross member assembly 20 is retained on both sides of its housing 130 against adjacent pin connectors 136. Disengagement of the handle 100 and retention blocks 102, 104 is performed by reversing the operation described above. Consequently, the spring biased handle 100, retention blocks 102, 104 and retention surfaces 106, 108 may alternatively form the second detachable mount 22. Furthermore, complete rotation (see FIG. 8b) of the cup-shaped fitting 70 captures the axle 92 as a result of the orientation of the fitting 70 relative to the axle 92, i.e., the larger major diameter $92_{MA}$ of the axle 92 cannot pass the throat region 86 of the slot 78.

The retention blocks 102, 104 remain engaged by the force of the coil spring 110, however, resiliency of other abutting surfaces, i.e., between the cross member assembly 20 and the main frame subassembly 10, 12, the efficacy of the latch retention. In the described embodiment, cylindrical resilient bearings 160, e.g., elastomer bumpers, may engage C-shaped seating surfaces 164 disposed at the forward end of each side frame support 30. The bumpers 160 are cylindrical and provide a soft or resilient seating surface so that additional spring force may be applied to the second detachable mount 24. Additionally, the soft mount also serves to maintain the lateral and vertical position of the cross member assembly 20 relative to each of the main frame subassemblies 10, 12.

In addition to the forces applied by the coil spring 110 and resilient bearings 160, the handle 100 and retention blocks 102, 104 may be positively retained by the relative position of other wheelchair components. In the preferred embodiment, battery boxes 302a, 302b (see FIG. 14a) may be positioned proximal to the handle 100 so as to prevent its rotation and release of the cross member assembly 20 until the boxes 302a, 302b are disassembled. The assembly and disassembly of the power supply module will be discussed hereinafter.

Figure 10:
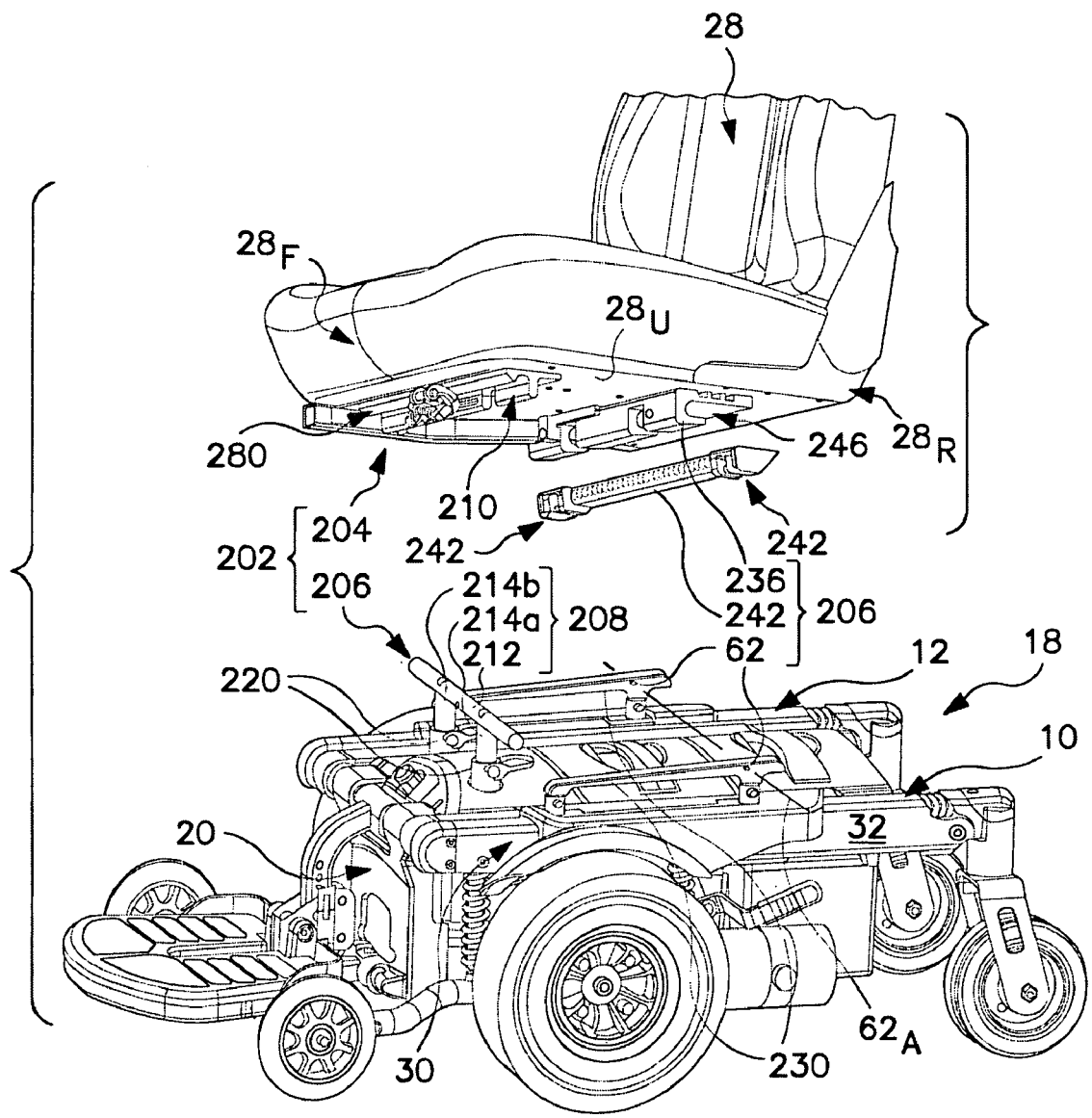
FIG. 10 is an exploded view of the seat support assembly for detachably mounting a seat to the main frame assembly of the wheelchair.

In FIG. 10, the seat support assembly 200 is detachably mounted to the main frame assembly 18 of the powered wheelchair 2. The seat support assembly 200 comprises a trapeze bar assembly 202 supporting a forward portion of the seat 28 and a pivot mount assembly 206 supporting an aft portion of the seat 28. More specifically, the forward trapeze bar assembly 202 includes a channel 204 disposed in combination with the underside $28_U$ of the seat 28 and a span bar 208 disposed in combination with the main frame assembly 18.

The channel 204 extends laterally from one side of the seat 28 to the other, has a substantially inverted J-shaped cross sectional configuration, and has an opening 210 facing downwardly for engaging the span bar 208. The span bar 208 comprises a laterally extending bar 212 supported by a pair of vertical stanchions 214a, 214b. Together the bar 212 and vertical stanchions 214a, 214b define a substantially double-T profile configuration, however, a variety of profile configurations may be employed including a U- or L-shaped configuration.

In the preferred embodiment, the span bar 208 is disposed in combination with the cross member assembly 20. Preferably, the vertical stanchions 214a, 214b fit into mounting sleeves 220 (see FIG. 10) and may be adjustable vertically to raise or lower the forward portion $28_F$ of the seat 28. When used in this manner, the span bar 208 may be used as a handle for rotating the cross member assembly 20 during assembly and disassembly. This also provides a convenient means for carrying the cross member assembly 20 during transport of the wheelchair 2.

The pivot mount assembly 206 includes, inter alia, a channel assembly 208 disposed in combination with the underside $28_U$ of the seat 28 aft of the trapeze bar assembly 202 and, furthermore, is adapted to facilitate pivot motion of the seat 28 about a transverse pivot axis, i.e., an axis parallel to the pitch axis (not shown) of the wheelchair. With respect to the latter, the pivot mount assembly 206 includes a pair of lateral pins 62 each disposed in combination with the horizontal upper segment 32 of one of the main frame subassemblies 10, 12. More specifically, the lateral pins 62 are each disposed in combination with a longitudinal support bar 230 which is mounted to the side frame support 30 of a respective main frame subassembly.

The longitudinal support bar 230, which is disposed substantially parallel to and co-planar with the horizontal upper segment 32 of the side frame support 30, serves two principle functions. A first is the support of the seat, most especially, to align the underside of the seat 28 with the lateral pins 62. It will be appreciated that with pivot mounting assembly 206 being disposed its underside, assembly and disassembly must essentially be performed by tactile rather than visual feedback. Consequently, the longitudinal support bars 230 seat within a groove or track of the seat and guided onto the pins 62. This will be discussed in greater detail in the subsequent paragraphs. Secondly, the support bars 230 function as a handle for manipulating and lifting each of the main frame subassemblies 10, 12 during assembly and disassembly. Consequently, a dedicated handle, i.e., in addition to a seat supporting/guiding bar, is not required.

Figure 11A:
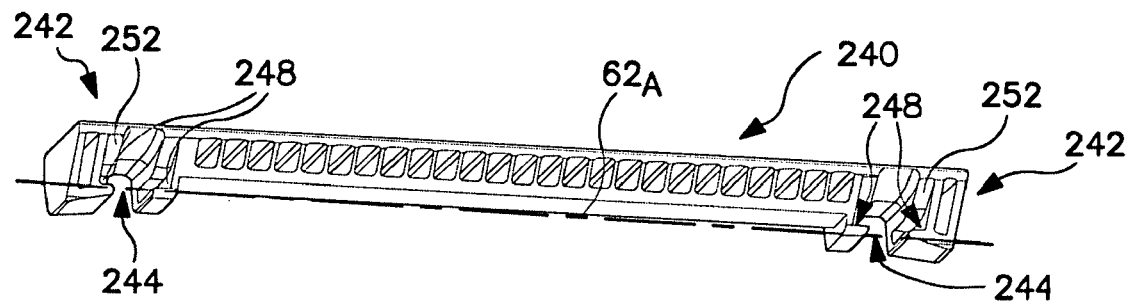
FIG. 11a is an isolated perspective view of a intermediate span bar for detachably mounting the wheelchair seat to the main frame assembly.
Figure 11B:
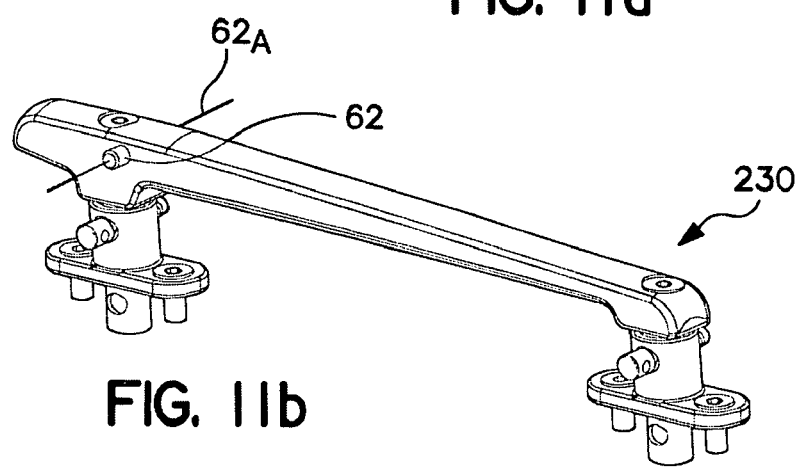
FIG. 11b is an isolated perspective view of a longitudinal support bar for guiding the span bar into engagement with a pair of retaining pins, and functioning as a handle to manipulate and lift a main frame subassembly for transportation and storage.

In FIGS. 10, 11a, and 11b, the pivot mounting assembly 206 also includes a channel 236 (FIG. 10 only) disposed in combination with the underside $28_U$ of the seat 28 and an interface bar 240 having end fittings 242 for engaging the lateral pins 62. More specifically, the channel 236 extends laterally across the underside $28_U$ of the seat, has a substantially C-shaped cross sectional configuration and has an opening 246 (see FIG. 10) facing rearwardly. The interface bar or intermediate span bar 240 has a cross-sectional configuration which may be accepted internally of the channel 236, a pair of grooves 244 proximal to each end for accepting and sliding along the upper surface of the longitudinal support bar 230 and a pair of tracks 248 for accepting the lateral pins 62 disposed through the support bar 230. Regarding the latter, the tracks 248 have an open end 252 facing rearwardly for accepting the lateral pins 62 and, when fully engaged permit a limited degree of pivotal motion about the pivot axis $62_A$ of the lateral pins 62.

Figure 12:
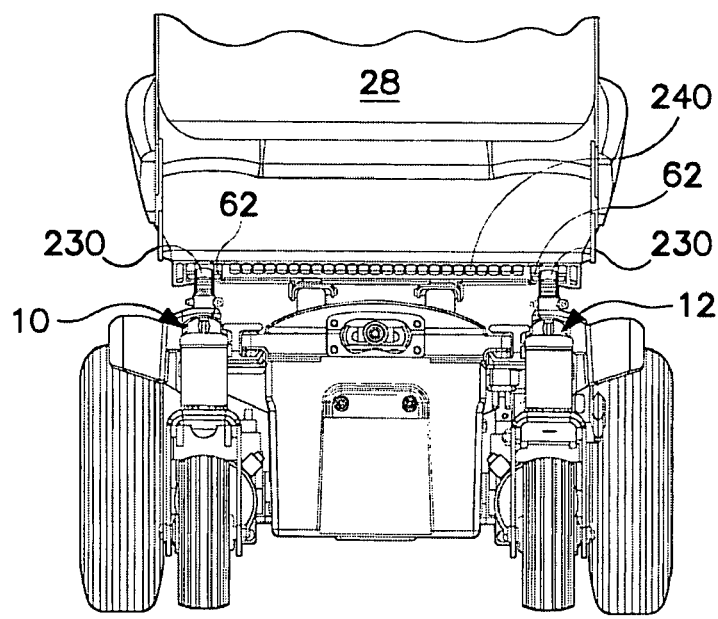
FIG. 12 is a rear view of the seat support assembly showing the engagement of the lateral pins with the intermediate span bar.

In FIG. 12, the longitudinal support bar 230 rides in the channels or grooves 244 of the intermediate span bar 240 to guide the lateral pins 62 into engagement. While the pins 62 are shown to extend through the longitudinal support bar, it will be appreciated that the pins 62 need only extend or project from on side of the support to effect the necessary pivot displacement. That is, assembly and disassembly requires a small degree of pivot motion to enable to forward channel 204 to sit upon the forward span bar 206.

While the weight of the seat and occupant may be deemed sufficient to effect passive engagement with the span bar 208 and lateral pins 62, it is preferable to employ a latching mechanism 280 to effect positive engagement of the assemblies 202, 206. In FIGS. 10, 13a–13c, the latching mechanism 280 is affixed to the forward channel 204 for maintaining the position of the span bar 208. More specifically, the latching mechanism 280 includes a mounting plate 282 (FIGS. 13a–13c) affixed to a negatively sloping face surface of 284 (FIG. 13a) of the forward channel 204. Retention fingers 286a, 286b are pivotally mounted to the base plate 282 and project downwardly and rearwardly to partially close the channel opening 210. The fingers 286a, 286b are torsionally-biased to a fully-extended position by means of a torsion spring 288 (only the ends are visible in FIGS. 13b and 13c). Further, the fully-extended position is shown in solid lines in FIG. 13c.

Figure 13A:
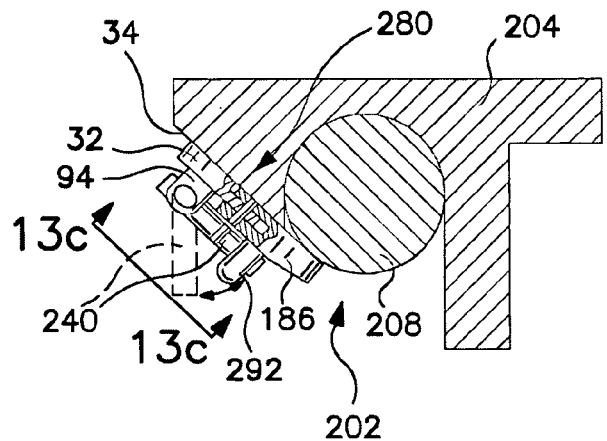
FIG. 13a depicts a broken away side view of a latching mechanism for retaining a forward channel to a span bar thereby retaining the wheelchair seat.
Figure 13B:
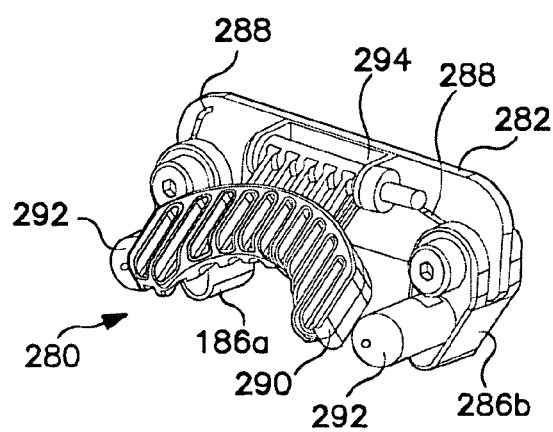
FIG. 13b is an isolated perspective view of the latching mechanism for retaining the wheelchair seat.
Figure 13C:
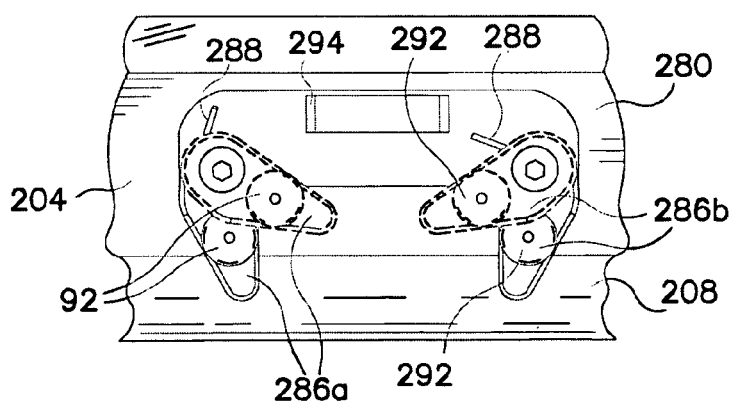
FIG. 13c is a broken away front view of the latching mechanism illustrating the engaged and disengaged positions thereof.

In addition to the torsion spring 288, the retention fingers 286a, 286b are held in the fully-extended position by a Y-shaped block 290 which abuts a pair of thumb release handles 292. The block 290 is pivotally mounted to a bracket 294 of the latch plate 282 and may be rotated to a "stop" or "release" position. FIG. 13a shows the stop position of the block 290 in solid lines and the release position in phantom or dashed lines. Further, the block 290 has been omitted from FIG. 13c to more clearly illustrate the "release" position of the retention fingers 286a, 286b. With the block 290 rotated to the stop position, the engagement fingers 286a, 286b are fully-extended and partially close the opening 210 to positively retain the span bar 208 in the channel 204. With the block 290 rotated to the release position (see FIG. 13a), the engagement fingers 286a, 286b are rotated inwardly (as best seen FIG. 13c) to provide additional clearance in the opening, thus releasing the span bar 208. Hence, with the seat 28 in its resting position, i.e., channels 204, resting upon the span bars 208, the occupant need only reach down under the seat 28, lift/rotate the stop block 290 and squeeze the thumb release handles 292 to engage or disengage the seat 28.

Figure 14B:
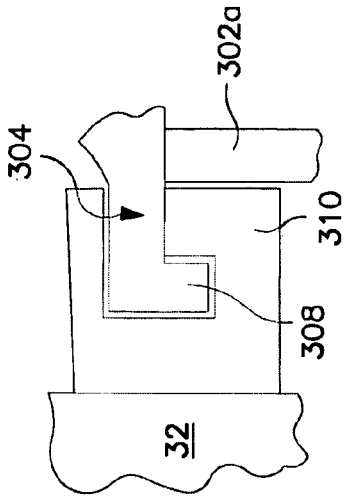
FIGS. 14a–14c depict the power supply unit including the mounting of a pair of battery boxes to a side rail support.
Figure 14C:
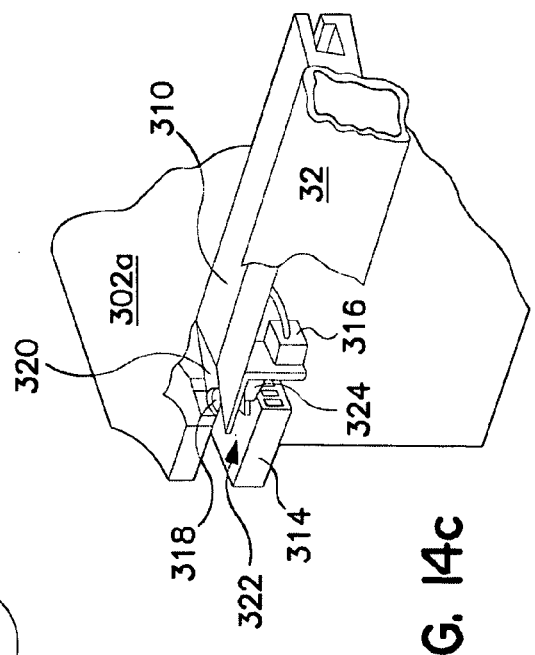
Figure 14A:
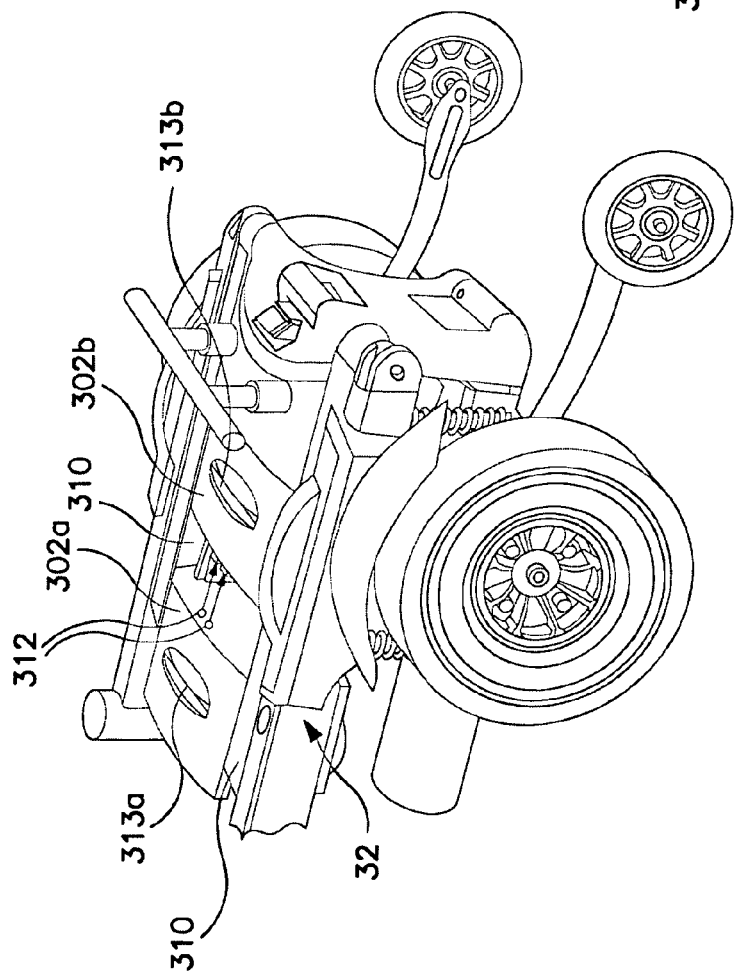

In FIGS. 14a–14c, a power supply unit 16 for providing power to the wheelchair 2 detachably mounts to each of the main frame subassemblies 10, 12. In the described embodiment, the power supply unit 16 comprises two battery boxes 302a, 302b for housing two DC batteries (not shown). Each of the battery boxes 302a, 302b have flanges 304 projecting laterally to each side of the boxes 302a, 302b and each flange 304 thereof includes a runner 308 along its peripheral edge. The runners 308 slidably engage rails 310 which mount to the main frame subassemblies 10, 12. More specifically, each rail 310 is disposed in combination with the upper support segment 32 of each of the main frame subassemblies 10, 12. The rails 310 are generally parallel and adapted in length to receive two battery boxes 302a, 302b in tandem.

Each of the battery boxes 302a, 302b are slid longitudinally into the rails 310 and have intermediate connectors 312b disposed between the boxes to electrically connect the battery boxes 302a, 302b. Furthermore, connectors 312a (see FIG. 7) may be employed should the cross member assembly 20 be integrated with a controller or battery charger. Handles 313a, 313b are provided along the upper surface of the battery boxes 302a, 302b to facilitate lifting and manipulation as the boxes 302a, 302b are slid into or out of the rails 310. In FIG. 14c, when the runners 308 of the boxes 302a, 302b are fully engaged, a plug 314, disposed in combination with rear box 302b, engages a receptacle 316 mounting to the underside of a rail 310. A retention pin 318 projects upwardly into the channel 320 of the rail 310 to ensure that the power supply unit 16 will not inadvertently slide rearwardly out of engagement, i.e., upon an acceleration of the powered wheelchair 2. That is, the retention pin 318 may be recessed into an aperture against the biasing force of a spring (not shown) when the weight of the battery box 302, i.e., as applied by the rail thereof, urges the pin 318 downwardly. When the battery box 302 has passed the retention pin 318 in the channel 320, the biasing force of the spring causes the retention pin 318 to project upwardly into the channel 320.

A further safety feature is provided by a latching mechanism 322 which is disposed in combination with the retention pin 318. The latching mechanism 322 which is operable to prohibit electrical connectivity between the plug 314 and receptacle 316 until the runner has fully engaged the rail 310, i.e., slid past the retention pin 318. More specifically, the latching mechanism employs a lever 324 to interfere with the plug/receptacle engagement when the battery boxes 302a, 302b are not fully engaged. That is, the lever 324 rotates downwardly to block the insertion of the plug 314 into the receptacle 316 when the retention pin 318 is recessed, i.e., when the weight of the battery box 302b is on the retention pin, and, consequently, not fully engaged. The lever 324 may only be removed or rotated to a non-interfering position when the retention pin 318 is fully extended, i.e., when the rail 308 has passed the retention pin and the weight of the box 302b is not acting on the pin 308. In the preferred embodiment, a single latch mechanism 322, along one of the rails 310, is employed to avoid the complexities and cost of redundant latch mechanisms.

Referring collectively to the figures, the transportable wheelchair 2 is assembled by first laying the cross member assembly 20 flat or horizontally on the ground. The main frame assemblies 10, 12 are positioned upright to engage the cross member assembly 20 by effecting the first detachable mount 22. As such, the mount 22 is capable of maintaining the relative position of the subassemblies 10, 12. The cross member assembly 20 is then rotated to effect engagement of the second detachable mount 22 while, in one embodiment of the invention, simultaneously effecting engagement of one or more electrical connectors (see FIG. 9). Next, referring to FIGS. 14a and 14c, the battery boxes 302a, 302b are slid forwardly into engagement with the rails 310 until the retention pin 318 (FIG. 14c) engages the rear battery box 302b, i.e., projects upwardly by the force of the spring. As was mentioned earlier, the lever 324 may now be rotated to a non-interfering position to allow the plug 314 to engage the receptacle 316. Furthermore, the batteries 302a, 302b bear against the handle 100 of the second detachable mount 24 to prevent rotation tending to disengage the retention blocks 102, 104 from the retention surfaces 106, 108.

Referring to FIGS. 10 and 11, the seat 28 is laid upon the longitudinal support bars 230 such that the grooves 242 of the interface bar 240 may slide forward and aft; The seat is pivoted upwardly and slid rearwardly causing the lateral pins 62 engage the track 244 of the interface bar 248. Once in position, i.e., with the forward channel 204 disposed vertically over the forward span bar 208, the seat 28 is pivoted downwardly so that the channel 204 sits upon an span bar 208. Of course, the latching mechanism 280 must be open to allow the forward channel 204 to engage the span bar 208 as the seat 16 is set vertically downward. The thumb release handles 292 (see FIG. 13c) are released to allow the torsionally-biased fingers 286a, 286b to close the opening 210 of the forward channel 204.

The disassembly of the powered wheelchair 2 is essentially the reverse of the foregoing assembly steps and, in the interest of brevity, will not be reiterated herein. The various assembly/disassembly steps may be arranged in a different order, depending upon the clearance provided between elements. For example, the battery boxes may be installed before or after the seat has been attached to the main frame assembly 18.

In summary, the transportable powered wheelchair of the present invention is modularized to separate the wheelchair into manageable sections or modules. That is, the powered wheelchair comprises only five modules, i.e., two main frame subassemblies, a cross member assembly and two (2) battery boxes, which define the power supply unit. The assembly process is facilitated by first and second detachable mounts 22, 24 for connecting the cross member assembly to each of the main frame subassemblies 10, 12. That is, the first detachable mount 22 functions to spatially position and support the main frame subassemblies 10, 12, i.e., in an upright position. Further, the first detachable mount 22 maintains such pre-positioning to permit the attachment of the second detachable mount 24 to structurally interconnect the subassemblies 10, 12 at two positions. The detachable mounts are also spaced-apart to structurally augment the main frame assembly 18.

In addition to structurally interconnecting the main frame subassemblies, 10,12 the cross member assembly 20 may function to facilitate electrical connections between the power supply unit 12 and the electrical systems employed on the powered wheelchair 2. That is, the electrical connections are made simultaneously as the second detachable mount 24 is made. In the preferred embodiment, the cross member assembly 20 may structurally support other systems to integrate such modules and reduce the number of assemblies to be connected. In addition to supporting and repositioning the subassemblies 10, 12 the cross member assembly is configured to permit handling and attachment by a simple rotational motion which negates the need for two or more persons to assemble/disassemble the powered wheelchair.

In addition to making structural and electrical connections the cross member assembly may further produce or provide a support for the seat assembly. This is, the cross member assembly may support the trapeze bar assembly. In the preferred embodiment, the abutment surfaces 106, 108 are disposed in combination with the pin connectors 136, i.e., along the back side surface of each of the connectors 136. However, it should be appreciated that any surface disposed in combination with one or both of the main frame subassemblies 10, 12 which is capable of reacting a substantially horizontal load or load component may be employed.

A variety of modifications to the embodiments described will be apparent to those skilled in the art from the disclosure provided herein. For example, while the batteries 302a, 320b are shown as having a runner disposed in combination with a rail, other detachable mounting schemes may be employed. For example, the battery boxes may include J-hooks for being hung upon a longitudinal rod disposed along the side frame supports of the main frame subassemblies. Moreover, a footrest assembly may be incorporated as an option, and, therefore, may be disposed in combination with the cross member assembly.

Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. A power wheelchair adapted to facilitate transport, said powered wheelchair having a power supply unit, a pair of primary drive wheels, and a drive train subassembly rotatably mounting and independently driving at least one of the drive wheels, the power wheelchair further comprising:
   first and second main frame subassemblies each mounting one of the drive train subassemblies and detachably mounting the power supply unit therebetween;
   at least one cross member assembly connecting said main frame subassemblies when assembled for operation, said cross member assembly being detachable to separate said main frame subassemblies during transport,
   said cross member assembly in combination with said main frame subassemblies defining a main frame assembly having first and second detachable mounts, said first detachable mount adapted to support and pre-position said main frame subassemblies during assembly, said second detachable mount adapted to latch the cross member assembly in an upright position, said cross member assembly rotating from a horizontal to a vertically position to engage said detachable mounts, and
   a seat detachably mounted to said main frame assembly.

2. The power wheelchair according to claim 1 wherein said first detachable mount attaches said cross member assembly to each of said main frame subassemblies at a first position along the subassemblies, said first detachable mount defining a hinge axis, said second detachable mount including a spring-biased handle pivot mounted to the cross member assembly and a pair of retention blocks disposed between the pivot mount and the handle grip, and wherein the cross member assembly rotates about said hinge axis to cause each of said retention blocks to engage a vertical abutment surface of a respective main frame subassembly.

3. The power wheelchair according to claim 1 wherein the first detachable mount is adapted to pre-position said main frame assemblies in an upright position.

4. The power wheelchair according to claim 1 wherein said first detachable mount comprises a circular retention head disposed in combination with each of the main frame subassemblies and a cup-shaped fitting disposed in combination with said cross member assembly, said circular retention head being disposed in said cup shaped fitting and defining a hinge axis about which said cross member assembly rotates.

5. The power wheelchair according to claim 2 wherein said first detachable mount includes a pair of pivot mounts, each pivot mount interposing said cross member assembly and each of said main frame subassemblies and further comprising:
- a cup-shaped fitting disposed in combination with said cross member assembly, said cup-shaped member defining a pocket having an open end;
- a retention fitting disposed in combination with said main frame subassemblies, said retention fitting comprising a circular retention head and an axle projecting laterally from said main frame subassembly for structurally interconnecting said retention head to said subassembly, and
- each said pocket of said cup-shaped fitting accepting said circular retention head.

6. The power wheelchair according to claim 2 wherein said second detachable mount includes a pair of retention blocks detachably bearing against abutment surfaces, said retention blocks affixed to a handle pivot mounted to said cross member assembly, said handle pivotable in a first direction to effect engagement of said retention blocks and pivotable in a second direction to disengage said retention blocks.

7. The power wheelchair according to claim 1 further comprising a seat support assembly for detachably mounting a seat, said seat support assembly including:
- a trapeze bar assembly detachably mounting a forward portion of said seat to the main frame assembly; and
- a pivot mount assembly comprising a pair of lateral pins defining a pivot axis, and a interface bar attached to the underside of the wheelchair seat, said interface bar having end fittings for accepting said lateral pins and pivotable about said pivot axis.

8. The power wheelchair according to claim 7 wherein said trapeze bar and interface bars are mounted to the underside of the wheelchair seat by forward and aft channels, respectively, said forward channel having a downwardly facing opening, and said aft channel having a rearwardly facing opening.

9. The power wheelchair according to claim 7 further comprising a longitudinal seat support bar disposed in combination with the horizontal upper segment of each main frame subassembly, and wherein said interface bar has a pair of grooves disposed at each end for accepting each of said longitudinal seat support bars, said grooves, furthermore, guiding said interface bar into engagement with said lateral pins during assembly.

10. The power wheelchair according to claim 9 wherein said longitudinal seat support bar aligned with and mounts at both ends to said horizontal upper segment, said seat support bar forming a handle for manipulating and lifting said main frame subassemblies during assembly and disassembly.

11. The power wheelchair according to claim 1 wherein each of said main frame subassemblies includes a rear castor assembly for mounting a castor wheel about a vertical axis, said castor assembly including an end fitting projecting orthogonally of the vertical axis, said end fitting mounting to an end of said main frame subassembly about a pivot axis which is parallel to the wheelchair pitch axis, and further comprising spring bias means disposed between said main frame subassembly and said castor assembly for biasing the castor assembly about said pivot axis.

12. The power wheelchair according to claim 1 wherein said spring bias means is a coil spring interposing said main frame and castor assemblies, said castor assembly defining a cup-shaped receptacle for accepting an end of coil spring, and said main frame subassembly defining fitting for accepting the other end of said coil spring.

* * * * *

UNITED STATES PATENT AND TRADEMARK OFFICE
CERTIFICATE OF CORRECTION

PATENT NO. : 7,207,403 B2  Page 1 of 1
APPLICATION NO. : 10/960541
DATED : April 24, 2007
INVENTOR(S) : Grymko et al.

It is certified that error appears in the above-identified patent and that said Letters Patent is hereby corrected as shown below:

<u>In Column 14</u>
At line 54, change "position" to --position wherein--.
At line 55, change "rotating" to --rotate--; and "horizontal" to --horizontal position--.
At line 56, change "vertically" to --vertical--.

Signed and Sealed this

Fourteenth Day of August, 2007

JON W. DUDAS
*Director of the United States Patent and Trademark Office*